Sept. 9, 1941.   F. C. McINTOSH   2,255,179
AUTOMATIC CONTROL OF ATMOSPHERIC CONDITIONS
Filed Feb. 14, 1938
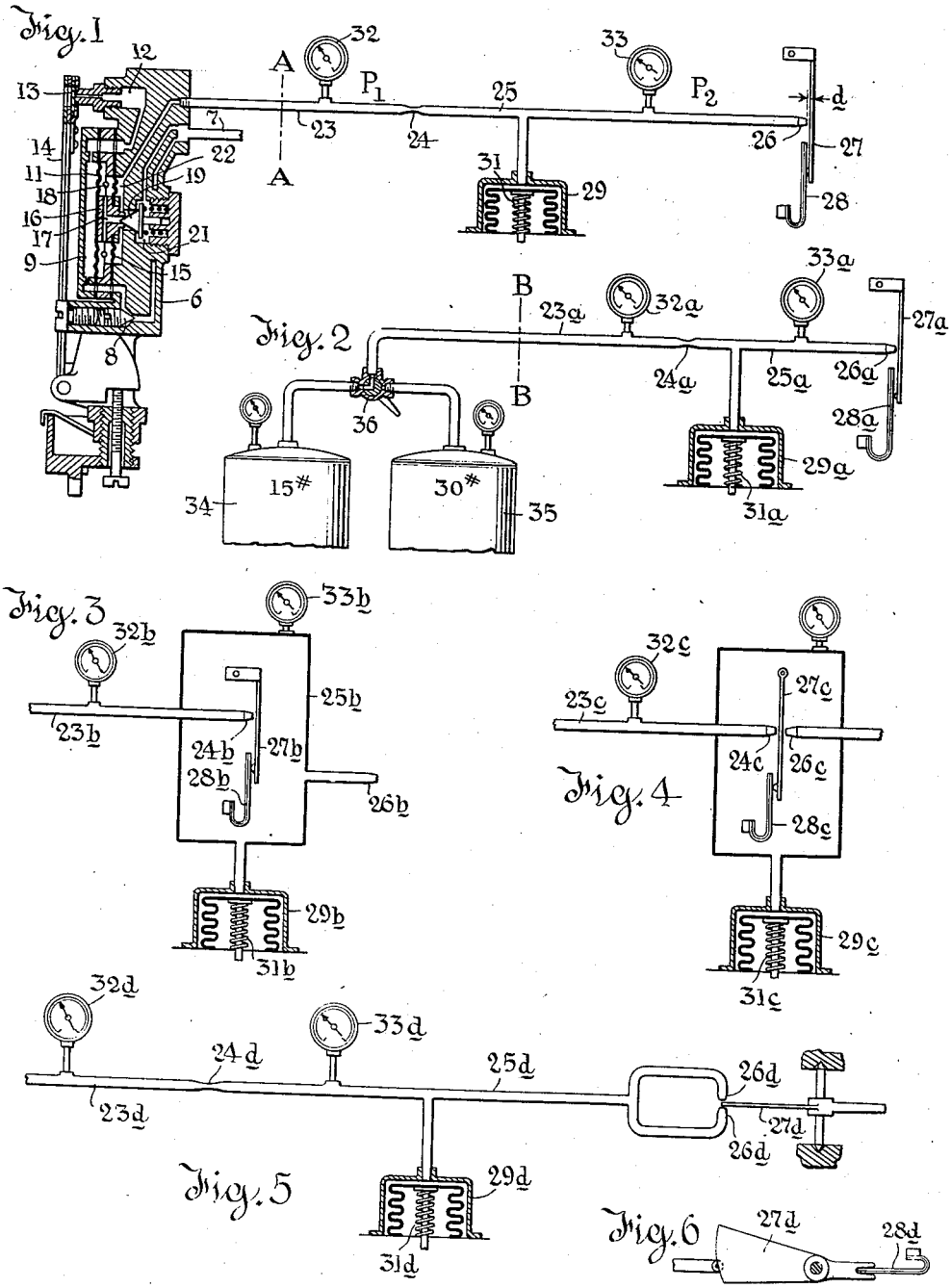
Inventor
Fabian C. McIntosh
By
Dodge and Sons
Attorneys Patented Sept. 9, 1941

2,255,179

UNITED STATES PATENT OFFICE 2,255,179

AUTOMATIC CONTROL OF ATMOSPHERIC CONDITIONS

Fabian C. McIntosh, Pittsburgh, Pa., assignor to Johnson Service Company, Milwaukee, Wis., a corporation of Wisconsin Application February 14, 1938, Serial No. 190,508

7 Claims. (Cl. 236—79)

This invention relates to the control of atmospheric conditions, familiar examples of which are control of temperature, control of humidity, or both. For simplicity in description, reference will be made to temperature control without implying exclusion of other controls such as humidity control.

In the control of temperature extensive use has been made of what are known as re-adjustable thermostats. For example, a thermostat responsive to dry bulb temperature in a room and controlling room temperature may have its thermostatic element physically adjusted in response to relative humidity in the room, or in response to outdoor temperature, or in response to mean radiation intensity, or some other variable quantity which requires or renders desirable an adjustment of the contol point of the thermostat.

Another type of re-adjustable thermostat comprises the so-called "night and day" thermostats which are physically readjusted, commonly by a clock, to maintain one temperature during occupancy or day-light hours, and another temperature during the unoccupied or night-time hours.

With a thermostat of the pneumatic leak port type readjustment has been effected by physical adjustment of the thermostatic element. This involves considerable mechanical complication. So far as I am aware, all of the prior art schemes used with such thermostats involve either an actual mechanical adjustment of the thermostatic element or a selection between two differently adjusted elements. This adjustment or selection has been performed in a number of ways, for example, by the use of electric circuits and magnets, by the change of supply pressure which operated an adjusting or selecting motor, and by manual means.

The present invention involves a direct approach to the problem based on the control characteristics of pneumatic leak port thermostat.

The term "pneumatic leak port thermostat" is used in the present specification to define a thermostat in which compressed air is fed serially through two orifices, a supply orifice, and a discharge orifice, the pressure developed between the orifices operating a controlling motor either directly or through an interposed relay. (See patent to Otto 1,500,260, July 8, 1924.) The pressure between the orifices is controlled by thermostatic valve means which vary the relative flow capacities of the orifices.

This can be accomplished in any of three ways, (1) variably throttling the supply orifice, (2) by variably throttling the discharge orifice, or (3) by simultaneously variably throttling the two orifices in reverse senses. So far as the broad principle of the present invention is concerned, these three schemes are approximate equivalents, but the rate at which the regulatory pressure varies in response to changes of position of the control element differs slightly as between the three different schemes, and selection may turn in particular cases on the control characteristics which are sought.

The invention is based on the physical fact that the pressure developed between the orifices as the result of any given throttling condition, may be independently changed by changing the pressure at which fluid is supplied to the supply orifice. Within practical commercial limits the variation effected by changing the supply pressure is not very great so that the scheme appears to offer its greatest commercial utility where moderate readjustment is desired.

With leak ports of commercial size and thermostatic valves of commercial accuracy it is practicable to shift the control point of the thermostat as much as 10 Fahrenheit degrees by varying the supply pressure between 15 pounds and 30 pounds gage. While the physical principle holds good below 15 pounds gage the attendant lower range of adjustment and the increasing percentage error caused by manufacturing errors of given magnitude, implies that commercial operation in the lower pressure ranges is undesirable, except where the expense of very precise manufacture is warranted.

The invention permits control in response to two different atmospheric conditions, the term "different" being used to indicate either difference of location or difference of kind. Thus we might control by temperatures at two different points, or by temperature and humidity at the same or at different points.

For purposes of explanation, a description will now be given of several exemplary embodiments of the invention. No attempt will be made to illustrate the application of the invention to specific psychrometric control problems, but it is to be understood that the invention is generally applicable where an instrument responsive to atmospheric conditions, such as a thermostat or a humidostat, is to be re-adjusted in accordance with some different atmospheric condition, the term "different atmospheric condition" being used in the sense above defined.

In the accompanying drawing:

Figure 1 is a sectional view showing largely in diagram a control system in which a motor is caused to respond to two different variable quantities.

Fig. 2 is a similar view of a modified system in which a manually set device serves to change the point at which an element responsive to a variable quantity responds.

In the devices of Figs. 1 and 2 the discharge orifice of the leak port mechanism is the one which is variably throttled.

Fig. 3 shows a leak port mechanism which could be substituted for that shown in Figs. 1 and 2, and in which the supply orifice is variably throttled.

Fig. 4 shows a leak port mechanism which could be substituted for that shown in Figs. 1 and 2 and in which the supply and discharge orifices are variably throttled in reverse senses.

Fig. 5 shows another leak port mechanism similar to that shown in Figs. 1 and 2, but in which the throttling means is balanced, so as to be indifferent to discharging flow and hence more sensitive, particularly where the responsive element operates rather feebly.

Fig. 6 is a detail of the controlling vane shown in Fig. 5.

Referring first to Fig. 1, a relay thermostat of the general type shown in the patent to Otto No. 1,500,260, July 8, 1924, supplies air to the system and is given a special adjustment for this purpose, so that under all conditions it supplies air at positive but variable pressures.

The body of the thermostat, shown at 6 has an air supply 7 through which compressed air from any source is supplied at a pressure somewhat greater than the maximum pressure desired for supply to the system (the latter is assumed for discussion to be 30 pounds per square inch gage). Air is fed past needle valve 8 to chamber 9 forward of diaphragm 11 from which chamber leak port 12 leads to atmosphere. A valve 13 shifted toward and from the leak port 12 by thermostatic bar 14 (intended to typify any element responsive to an atmospheric condition) variably throttles the leak port 12.

Diaphragm 11 and a smaller diaphragm 15 are connected by hub 16 which has an exhaust port 17 leading to the space between the diaphragms, which space is vented to atmosphere at 18. When hub 16 moves inward, a combined supply and exhaust valve 19 first closes exhaust port 17 and is then forced from its supply seat to admit air from chamber 21 connected with supply 7 to chamber 22 behind diaphragm 15. Chamber 22 is connected with the variable pressure supply line 23.

The parts so far described typify any means available in the art to supply to line 23 a pressure which varies in response to a variable quantity (temperature in the example described).

Unlike gradual thermostats as heretofore used under the Otto patent, needle valve 8 is adjusted so that when leak port 12 is wide open a substantial pressure exists in chamber 9. For discussion an adjustment will be assumed such that when leak port 12 is wide open the pressure in line 23 will be 15 pounds gage and when the leak port is closed will be 30 pounds gage. Because of the differential between diaphragms 11 and 15, pressure in line 7 is above 30 pounds gage.

Line 23 supplies air through choke 24 (conventionally shown as a fixed restriction, the precise construction being immaterial) to a line 25 from which leak port 26 leads. Leak port 26 is controlled by gravitating valve lid 27 which is actuated by thermostatic bar 28 responsive to a temperature different from that which affects bar 14. Bar 28 typifies any element responsive to an atmospheric condition.

Connected to line 25 is a bellows motor 29 with return spring 31 which typifies any regulating device capable of operating in response to varying fluid pressure.

Gages 32 and 33 are provided to indicate pressures, i. e. $P_1$ in line 23 and $P_2$ in line 25. $P_2$ is a function of $P_1$ and of the interval $d$ between lid 27 and leak port 26. The relationship can be varied within limits by changes of proportion of components. Changes of $P_1$ shift the control point of bar 28. An increase of $P_1$ shifts the control point of bar 28 in one direction if the bar is direct acting and in the opposite direction if the bar is reverse acting, as will be readily understood.

For simple night and day adjustments, it is practicable to substitute for the parts 6–22 inclusive, (see Fig. 2 which shows such a modification), two supply tanks 34 and 35 maintained at different gage pressures, say 15 pounds and 30 pounds and selectively connected with variable pressure supply line 23a by a three way valve 36. The parts 24a to 33a in Fig. 2 correspond with parts 24 to 33 in Fig. 1 and have similar functions.

The device shown in Fig. 2 operates under the control of bar 28a to maintain one temperature when the 15 pound supply is connected, and a different temperature when the 30 pound supply is connected.

The components to the right of the line A—A in Fig. 1 and to the right of the line B—B of Fig. 2 comprise the basic components of a leak port thermostat commercially used by the Johnson Service Company. A relay is commonly added, but its presence or absence does not affect the basic operative principle. There are other approximately equivalent leak port mechanisms which might be substituted for the portion of Fig. 1 or Fig. 2 to the right of the lines mentioned. Examples of these are illustrated in Figs. 3 to 6 inclusive.

In Fig. 3, the chamber 25b takes the place of the line 25. The leak port 26b is simply a restricted vent of fixed size, whereas the supply passage 24b is a variable flow port controlled by the gravitating valve lid 27b which is operated by thermostatic or other responsive element 28b. All of the other parts in Fig. 3 correspond to similarly numbered parts in Fig. 1. The essential difference is that the pressure in the motor 29b is varied by variably throttling the supply instead of by variably throttling the exhaust, as in Figs. 1 and 2.

Fig. 4 resembles Fig. 3 but differs therefrom in that a supply leak port 24c and a vent leak port 26c are close enough together to be variably throttled in reverse senses by a swinging lid 27c which is actuated by a responsive element 28c.

The characteristic response of the device shown in Fig. 4 differs slightly from that shown in the other figures and might be preferred under certain circumstances because of these characteristics, but basically the operative principles are similar and the effects of varying the pressure in the variable pressure supply line 23c are the same as the effects of varying the pressures in the supply line 23 or 23b as the case may be.

The structure shown in Figs. 5 and 6 is essentially the same as that shown in Figs. 1 and 2, except that instead of a single leak port 26, two opposed leak ports 26d are used, and are controlled by a swinging vane 27d which is so pivoted as to be balanced with reference to the reaction of jets discharging from the leak port. Hence the jets exercise no force on the responsive element 28d which, in consequence, may be rather feeble in its response.

The purpose of illustrating various forms of leak port mechanism is to indicate the general availability of these various types in a system having a variable pressure supply to afford readjustment of the control point, or to afford conjoint control by two variables. Various other modifications are possible within the scope of the invention and the specific disclosures should be interpreted as illustrative rather than limiting.

What is claimed is:

1. The method of controlling a device for conditioning the atmosphere which comprises causing pressure fluid to flow serially through two orifices; causing the fluid pressure intermediate said orifices to regulate said device; varying the relative flow capacity of said orifices in accordance with an atmospheric condition to vary said regulatory fluid pressure; and simultaneously varying the pressure at which fluid is supplied to the first orifice, and thereby varying the rate of flow through such orifice, according to another atmospheric condition, such variation being through a range sufficiently great to modify said regulatory pressure and the range of variation being above a minimum value sufficiently high to insure continuous regulatory action.

2. A dual control device for controlling dampers, valves and the like comprising in combination, an expansible chamber motor having a supply orifice and a discharge orifice; means for supplying pressure fluid to the supply orifice; means responsive to an atmospheric condition for varying the flow capacity of at least one of said orifices to exercise a primary control on the pressure in said motor; and means for varying the pressure at which pressure fluid is supplied to said supply orifice, to vary the rate of flow through said orifice, such variation being in a degree sufficient to modify the characteristics of said primary control and the supply pressure always being above a minimum value high enough to insure variation of said primary control.

3. A dual control device for controlling dampers, valves and the like comprising in combination, an expansible chamber motor having a supply orifice and a discharge orifice; means for supplying pressure fluid to the supply orifice; means responsive to an atmospheric condition for varying the flow capacity of at least one of said orifices to exercise a primary control on the pressure in said motor; and means responsive to another atmospheric condition for varying the pressure at which pressure fluid is supplied to the supply orifice and, consequently, the rate at which pressure fluid flows through said orifice, such variation being in a degree sufficient to modify the characteristics of said primary control and the supply pressure being always above a minimum value sufficiently high to insure operation of said primary control.

4. A dual control device for controlling dampers, valves and the like, comprising in combination, an expansible chamber motor having a supply orifice and a discharge orifice; means for supplying pressure fluid to the supply orifice; means responsive to an atmospheric condition for variably throttling the discharge orifice to exercise a primary control on the pressure in said motor; and means for varying the pressure at which pressure fluid is supplied to said supply orifice, to vary the rate of flow through said orifice, such variation being sufficient in degree to modify the characteristics of said primary control and the supply pressure being above a minimum value sufficiently high to insure operation of said primary control.

5. A dual control device for controlling dampers, valves and the like, comprising in combination, an expansible chamber motor having a supply orifice and a discharge orifice; means for supplying pressure fluid to the supply orifice; means responsive to an atmospheric condition for variably throttling the discharge orifice to exercise a primary control on the pressure in said motor; and means responsive to another atmospheric condition for varying the pressure at which pressure fluid is supplied to said supply orifice, and consequently varying the rate of flow of pressure fluid through said orifice, such variation being in a degree sufficient to modify the characteristics of said primary control, and the pressure being always above a minimum value sufficiently high to insure operation of said primary control.

6. A dual control device for controlling dampers, valves and the like, comprising in combination an expansible chamber motor having a supply orifice and a discharge orifice; means for supplying pressure fluid to said supply orifice; means responsive to an atmospheric condition for varying the flow capacities of said orifices simultaneously in relatively reverse senses to exercise a primary control on the pressure in said motor; and means for varying the pressure at which pressure fluid is supplied to said supply orifice, whereby the rate of flow through the orifice for any adjusted capacity is modified, such variation being sufficient in degree to modify the characteristics of said primary control and the supply pressure being always above a minimum value high enough to insure operation of said primary control.

7. A dual control device for controlling dampers, valves and the like, comprising in combination an expansible chamber motor having a supply orifice and a discharge orifice; means for supplying pressure fluid to said supply orifice; means responsive to an atmospheric condition for varying the flow capacities of said orifices simultaneously in relatively reverse senses to exercise a primary control on the pressure in said motor; and means responsive to another atmospheric condition for varying the pressure at which pressure fluid is supplied to said supply orifice and thereby modifying the rate of flow through such orifice for any adjusted flow capacity, such variation being sufficient in degree to modify the characteristics of said primary control and the pressure supply always being above a minimum value sufficiently high to insure operation of said primary control.

FABIAN C. McINTOSH.